Nov. 3, 1936.  B. G. CARLSON  2,059,312
ANTIVIBRATION MOUNT FOR AIRPLANE INSTRUMENTS
Filed May 24, 1935
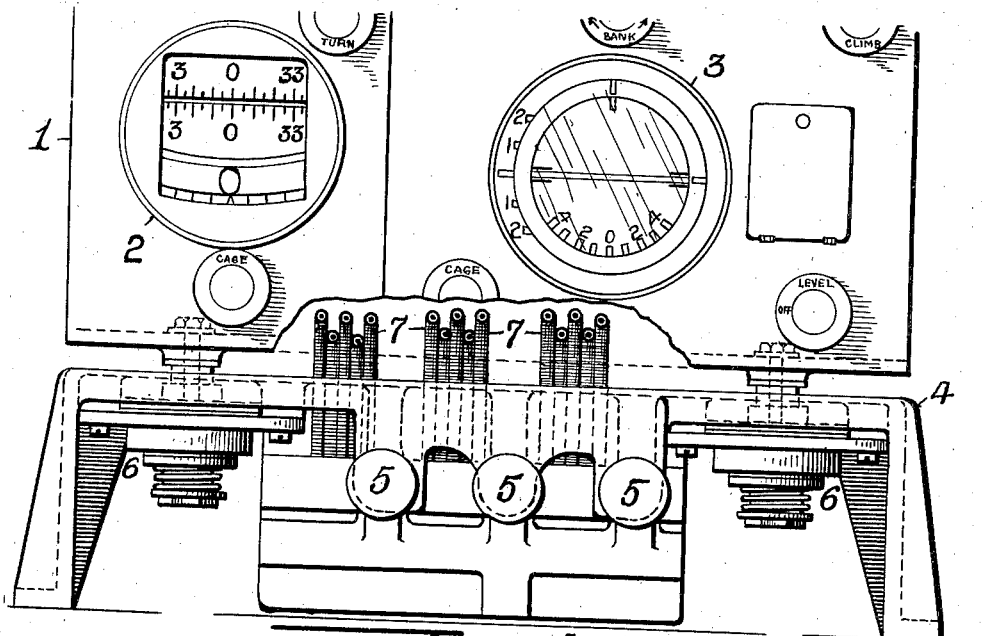
Fig. 1.
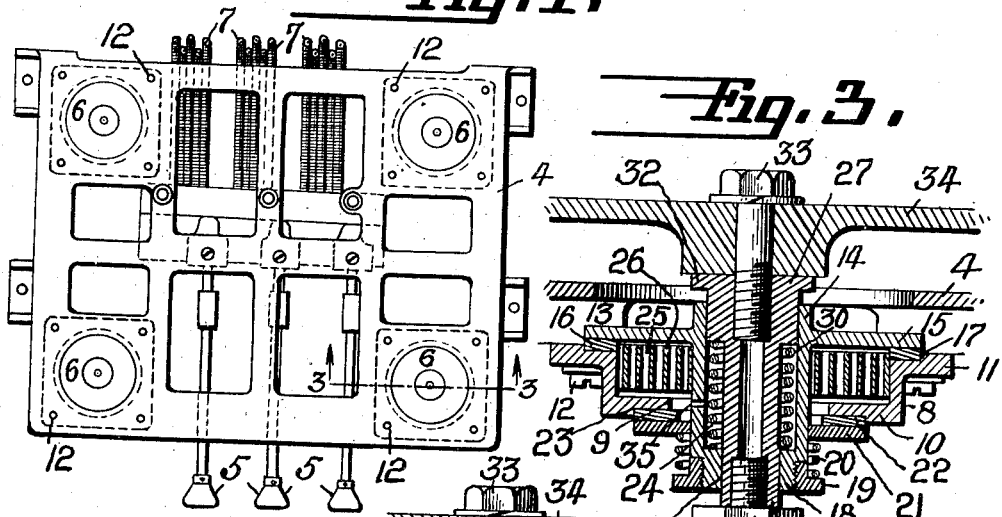
Fig. 2.
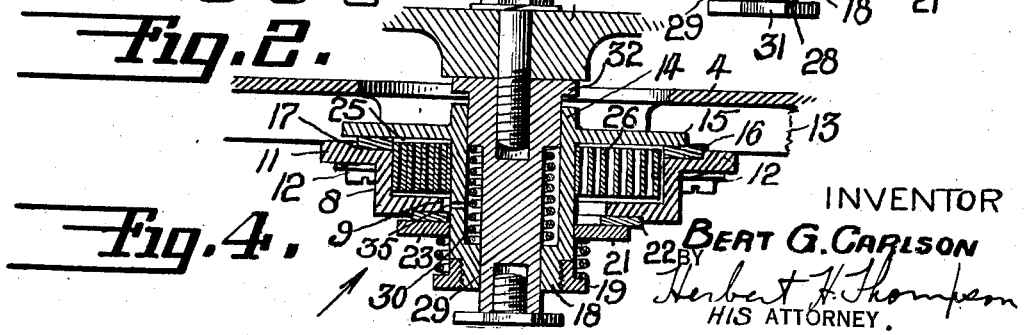
Fig. 3.
Fig. 4.
INVENTOR
BERT G. CARLSON
BY
Herbert H. Thompson
HIS ATTORNEY.

Patented Nov. 3, 1936

2,059,312

UNITED STATES PATENT OFFICE 2,059,312

ANTIVIBRATION MOUNT FOR AIRPLANE INSTRUMENTS

Bert G. Carlson, Bellerose, N. Y., assignor to Sperry Gyroscope Company, Inc., Brooklyn, N. Y., a corporation of New York Application May 24, 1935, Serial No. 23,153

6 Claims. (Cl. 248—358)

This invention relates, generally, to means for supporting automatic pilots and other sensitive devices within aircraft so that such devices are protected against engine vibrations, shock and other disturbing forces, and the invention has reference, more particularly, to novel shock absorbing supports to be used for this purpose.

The principal object of the present invention is to provide novel shock absorbing supports for automatic pilots and other devices having resiliently yieldable means for carrying the weight of the device, whereby vibrations and shocks are cushioned and are either not transmitted to the supported device or else transmitted in a gradual manner so that no injury can result to such supported device, the said shock absorbing supports having energy consuming means for dissipating the energy transmitted to the resiliently yieldable carrying means by vibrations and shocks.

Other objects and advantages will become apparent from the specification, taken in connection with the accompanying drawing wherein one embodiment of the invention is illustrated.

In the drawing,

Fig. 1 is a view in front elevation, with parts broken away or omitted, illustrating an automatic pilot supported upon a base plate by the novel shock absorbing supports of this invention.

Fig. 2 is a reduced plan view of the base plate of Fig. 1, having the novel shock absorbing supports of this invention thereon.

Fig. 3 is an enlarged fragmentary sectional view taken along line 3—3 of Fig. 2 and illustrating one of the novel shock absorbing supports in section, and Fig. 4 is a view similar to Fig. 3, but illustrates the action of the shock absorbing support as the result of a force acting in the direction of the arrow.

Referring now to the said drawing, the reference numeral 1 designates the front panel of an automatic pilot such as that disclosed in Patent No. 1,992,970, the said automatic pilot having a directional gyroscope 2 and an artificial horizon unit 3 together with associated apparatus mounted behind the panel 1. The automatic pilot is supported by means of the novel shock absorbing supports 6 of this invention upon a base plate 4 that is fixedly attached to the frame of the aircraft, the said base plate being illustrated as carrying control knobs 5 for controlling valves serving to supply oil through flexible tubes 7 to the various units of the automatic pilot. Although the novel shock absorbing supports are illustrated as supporting an automatic pilot, it is to be understood that the same may be used for supporting other devices to be protected against vibration and shocks.

According to the preferred construction, each of the shock absorbing supports 6 comprises a shallow cylindrical casing 8 open at its top and having a central circular aperture 9 in its bottom 10. Casing 8 has an outwardly directed substantially square flange 11 at its top, which flange is provided with vertical apertures at its corners for receiving screws 12 that extend through the flange 11 and are threaded into bosses 13 provided on base plate 4, thereby rigidly supporting the casing 8 upon the base plate 4.

A cylindrical housing member 14 extends vertically upwardly through casing aperture 9 and has an annular, horizontal flange 15 projecting outwardly from its upper portion. The peripheral portion of flange 15 rests and is supported upon an annular ring member 16 that is set into and fixedly retained within an annular groove 17 provided in the casing flange 11. The ring member 16 is preferably made of hardened material, such as hardened steel, while the flange 15 is preferably made of a softer material, such as brass or bronze, the flange 15 being free to slide horizontally over the supporting ring member 16, as will further appear.

Housing member 14 has a lower reduced portion 18 that is externally threaded for receiving a nut 19. A coil compression spring 20 surrounds the lower part of housing 14 and bears at its lower end upon nut 19 and at its upper end against a washer 21 that has a sliding fit on housing 14. Washer 14 is thus pressed upwardly by spring 20 against a ring member 22 that is similar to ring member 16. Ring member 22 is preferably made of hardened material and is fixedly retained in an annular groove 23 provided in the bottom 10 of casing 8, while washer 21 is preferably made of a somewhat softer material and is free to slide horizontally with respect to ring member 22, as will further appear.

With the cylindrical housing member 14 thus assembled upon the casing 8, there is provided an annular space 25 within casing 8 and surrounding housing member 14. A spiral centering spring 26 is contained within space 25 and bears at its outer end portion upon the inner wall of casing 8 and at its inner end portion upon the outer surface of housing member 14, thereby tending by its tension to retain housing member 14 centrally of casing 8 so that the vertical axes of housing member 14 and casing 8 substantially coincide. A cylindrical plunger 27 extends downwardly into the open upper end of the hollow housing member 14 and is vertically slidable within this housing member. Plunger 27 has a reduced lower portion 28 that extends downwardly within housing member 14, thereby providing an annular chamber 24 within this housing member. Portion 28 extends through a central slide bearing aperture 29 provided in the reduced portion 18 of member 14.

A coil compression spring 30 surrounds the portion 28 of plunger 27 within chamber 24 and bears at its lower end upon the lower portion 18 of housing member 14 and at its upper end upon the under surface of the enlarged upper portion of plunger 27, thereby urging this plunger upwardly. A headed screw 31 is threaded upwardly into the lower end of plunger 27, the head of which screw serves, by engaging the lower end of housing member 14, to limit the upward movement of plunger 27 under the action of spring 30. The top of plunger 27 is provided with an outwardly projecting annular flange 32 which, by engaging the upper end of housing member 14, serves to limit the downward movement of plunger 27.

The upper portion of plunger 27 has a central threaded vertical aperture for receiving a screw 33 that serves to secure the bottom 34 of the automatic pilot or other supported device to the top of plunger 27. The spring 30 is of such strength that the portion of the weight of the automatic pilot or other device carried by the particular shock absorbing support under consideration just serves to compress spring 30 sufficiently so that the flange 32 and the head of screw 31 are spaced substantially equal distances, respectively, above and below the top and bottom of housing member 14, as shown in Fig. 3. The chamber 24 is connected to the interior of housing member 14 by a small air vent or aperture 35 extending through the side wall of housing member 14.

In use, with the automatic pilot resting upon the shock absorbing supports 6, the parts of each of these supports are positioned about as shown in Fig. 3. The automatic pilot or other supported device possesses inertia, owing to its weight, and hence tends to remain in a state of rest or in uniform motion, so that engine vibrations and other disturbing forces of short time duration merely serve to intermittently compress the spring 30, and if any of these forces have a horizontal component such as the force indicated by the arrow in Fig. 4, such horizontal component will serve to momentarily compress spiral spring 26. These springs are thus set vibrating and since they are substantially non energy consuming, they would tend to transmit a reduced amplitude of the vibrations to the supported automatic pilot, and thus set the later in motion, but for the snubbing or frictional energy consuming action of air moving in and out of air vent 35 and the frictional action of flange 15 and washer 21 sliding transversely upon ring members 16 and 22, respectively. This will be apparent when it is noted that as casing 8, fixedly supported upon the aircraft frame, moves vertically under the action of a disturbing force, it correspondingly moves the housing member 14 vertically, whereby this housing member moves with respect to the relatively stationary plunger 27 connected to the automatic pilot, so that spring 30 is deflected and the volume of annular chamber 24 surrounding plunger 27 within housing member 14 changes, thereby causing air to be either forced out through the small orifice 35 or drawn in therethrough, depending upon whether housing member 14 moves upwardly or downwardly with respect to plunger 27. The frictional energy consuming action of the air in flowing through orifice 35 serves as a check to snub the rebound of spring 30 in both directions and hence prevents the transmission of motion to the automatic pilot. Likewise, transverse movements of casing 8 with respect to housing member 14, due to a horizontally acting disturbing force or force component, causes the deflection of spiral spring 26 while housing member 14 remains substantially stationary, the frictional resistance of flange 15 and washer 21 in sliding over annular ring members 16 and 22 serving to snub the rebound of spring 26 in both directions.

Thus, engine vibrations and other disturbing forces of relatively short amplitude and time duration are effectively prevented from being transmitted to the automatic pilot or other supported device, and all sudden shocks, even though of relatively long time duration, are considerably cushioned by the action of the novel shock absorbing supports of this invention, whereby the accuracy and dependability of the automatic pilot are greatly enhanced in use, thereby increasing the efficiency thereof as well as protecting the same from injury.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. A shock absorbing support for automatic pilots and other devices carried by aircraft, comprising a casing attached to the aircraft, a housing member frictionally supported directly upon said casing for limited transverse movement with respect to the latter, a plunger member connected for supporting the automatic pilot, said plunger member projecting into said housing member for limited vertical movement therein, resilient means interposed between said housing member and said casing, the frictional support of said housing member upon said casing serving to check said resilient means, and additional resilient means between said housing member and said plunger member, whereby said plunger member and the connected automatic pilot are cushioned against disturbing forces applied to said casing, and means for snubbing said additional resilient means.

2. A shock absorbing support for automatic pilots and other devices carried by aircraft, comprising a casing attached to the aircraft, a housing member supported upon said casing for limited transverse movement with respect to the latter, spring means interposed between said casing and said housing member, said casing and said housing member having cooperable friction surfaces for snubbing said spring means, a plunger member connected for supporting the automatic pilot, said plunger member projecting into said housing member for limited vertical sliding movement therein, and additional spring means interposed between said housing member and said plunger member, said housing member and said plunger member being so constructed and arranged, whereby limited ingress and egress of air from these members serves to snub said additional spring means, whereby disturbing forces applied to said casing are cushioned before reaching said plunger and its connected automatic pilot.

3. A shock absorbing support for automatic pilots and other devices carried by aircraft, comprising a casing attached to the aircraft, a housing member frictionally supported directly upon said casing for limited transverse movement with respect to the latter, a plunger member connected for supporting the automatic pilot, said plunger member projecting into said housing member for limited vertical movement therein, horizontally acting spring means interposed between said casing and said housing member, the frictional support of said housing member on said casing serving to snub said horizontally acting spring means, vertically acting spring means interposed between said housing member and said plunger member, said casing and said housing member being constructed and arranged to provide a dash pot action for snubbing said vertically acting spring means in both directions, whereby the automatic pilot is substantially unaffected by engine vibrations and other disturbing forces.

4. A shock absorbing support for automatic pilots and other devices carried by aircraft, comprising a vertically extending substantially cylindrical casing, a vertical housing member extending into said casing and supported thereupon for limited transverse movement, a spiral spring within said casing and engaging said housing member for holding the latter substantially centrally of said casing, a plunger extending downwardly into said housing member for limited vertical movement therein, and a coil supporting spring interposed between said plunger and said housing member, said housing member having an orifice in the wall thereof, whereby relative vertical movement of said housing member with respect to said plunger, due to deflections of said coil spring, will cause air to flow through said orifice, thereby checking the motion of said coil spring.

5. A shock absorbing support for automatic pilots and other devices carried by aircraft, comprising a vertically extending substantially cylindrical casing, a vertical housing member extending into said casing and supported thereupon for limited transverse movement, a horizontally disposed spiral spring confined within said casing and engaging said housing member for yieldably holding the latter substantially centrally of said casing, the frictional engagement of said housing member upon said casing serving to snub deflecting movements of said spring, a vertical plunger extending into said housing member for limited vertical movement therein, a coil compression spring interposed between said plunger and said housing member for supporting the former upon the latter, said housing member and plunger assembly having a restricted air opening to effect the snubbing of said coil spring in use.

6. A shock absorbing support for automatic pilots and other devices carried by aircraft, comprising a vertical, substantially cylindrical casing open at its top and attached to the aircraft, a substantially cylindrical housing member extending vertically downwardly through the open top of said casing and having a flange resting on the top of said casing for supporting said housing member on said casing while allowing limited transverse movement of said housing member with respect to said casing, a horizontally disposed spiral spring confined within said casing and engaging said housing member for yieldably holding the latter substantially centrally of said casing, the frictional engagement of said housing member flange upon said casing top serving to snub deflecting movements of said spring, a vertical plunger connected for supporting the automatic pilot, said plunger being slidably mounted in said housing member, a coil compression spring interposed between said plunger and said housing member for supporting the former upon the latter, said housing member and plunger assembly having a restricted air opening to effect the snubbing of said coil spring in use.

BERT G. CARLSON.